March 3, 1953 — P. R. GROSSMAN — 2,630,373
PROCESS AND APPARATUS FOR THE THERMAL
SYNTHESIS OF CARBON COMPOUNDS
Filed March 20, 1947 — 2 SHEETS—SHEET 1

INVENTOR
Paul R. Grossman
BY
ATTORNEY

Patented Mar. 3, 1953

2,630,373

UNITED STATES PATENT OFFICE 2,630,373

PROCESS AND APPARATUS FOR THE THERMAL SYNTHESIS OF CARBON COMPOUNDS

Paul R. Grossman, Irvington, N. J., assignor to The Babcock & Wilcox Company, New York, N. Y., a corporation of New Jersey Application March 20, 1947, Serial No. 735,978

17 Claims. (Cl. 23—206)

The present invention relates in general to a fluid heating process and apparatus for the thermal synthesis of carbon containing compounds, and more particularly to a process and apparatus in which high purity carbon disulfide is continuously formed by the thermal reaction of carbon and sulfur.

Heretofore carbon disulfide has been formed commercially by externally heating a cast iron retort containing liquid sulfur and charcoal to a temperature, usually about 1600–1800 F., at which the sulfur is vaporized and superheated and combines with the carbon of the charcoal to form carbon disulfide. In this process the ash residue of the charcoal forms a deposit on the retort, thermally insulating the same and causing overheating of the retort metal and requiring relative rapid replacement of the retort. Maintenance and replacement costs are high as the metal is useless as scrap due to its high sulfur content. In a second process the sulfur is vaporized and superheated to the desired reaction temperature in a fluid heater and then passed into a separate reaction chamber filled with charcoal where the carbon disulfide reaction takes place. In both processes, the periodic renewal of the charcoal and its ash residue result in impurities in the carbon disulfide produced, requiring subsequent purifying operations.

In accordance with my present invention a gas-pervious column or mass of fluent solid heat transfer material is continuously circulated through a series of connected zones at a predetermined rate. The heat transfer material is first heated to a high temperature by direct contact heat exchange relationship with a heating gas and then passed through a carbon deposition zone in which it heats a hydrocarbon vapor in direct contact relation therewith to a hydrocarbon dissociation temperature. Since the hydrocarbon is in direct contact with the heat transfer material during its thermal decomposition, carbon is deposited upon the surfaces of the heat transfer material, while the gaseous combustible constituents of the dissociated hydrocarbon are removed and advantageously utilized as a fuel for generating the heating gas in the heating zone. The heat transfer material and its deposited carbon at a high temperature are then passed into a reaction zone where the deposited carbon reacts with sulfur vapor to form carbon disulfide. The sulfur is introduced into the reaction zone in a liquid or vapor condition and in passing in direct contact relationship with the moving mass of carbon coated heat transfer material, is heated to a reactive temperature forming carbon disulfide, while the heat transfer material leaving the reaction zone is substantially free from its carbon coating and at a reduced temperature. After further cooling depending upon the desired final temperature of the heat transfer material, it is returned to the heating zone for reuse.

The principal object of the present invention is to provide apparatus for and a method of pyrogenic synthesizing carbon compounds which are characterized by a purity of product, economy of production and substantially continuous operation. A further and more specific object is to provide a method of operation and apparatus for the continuous production of a binary carbon compound by the thermal reaction of carbon deposited upon the surfaces of a heated fluent solid heat transfer material with a vapor of another element. A further specific object is to provide a control system for the apparatus described which is characterized by its ability to maintain balanced fluid pressures within the apparatus to prevent intermingling of the fluids. An additional object is to provide apparatus and a method of operation of the character described wherein high purity carbon is deposited upon the surfaces of a heated fluent solid heat transfer material by the thermal decomposition of a hydrocarbon fluid and the heated carbon coated heat transfer material subsequently passed in counter-current direct contact relationship with a thermally reactive element to form a carbon compound therewith. A further object is to provide apparatus and a method of operation of the character described wherein a hydrocarbon vapor is thermally dissociated in contact with, and deposits carbon upon, a fluent gas-pervious mass of solid heat transfer material and utilizes the hydrogen containing gas released by the thermal dissociation as a fuel constituent to heat the heat transfer material prior to the dissociation step. An additional object is to provide apparatus and a method of operation for the pyrogenic synthesis of carbon disulfide in a fluid heater wherein a stream of superheated sulfur vapor is brought into direct contact with carbon deposited on the surfaces of a heated fluent gas-pervious mass of solid heat transfer material at a thermally reactive temperature.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

While the invention in its broader aspects is applicable to the formation of many carbon compounds, particularly binary compounds other than hydrocarbons, the apparatus illustrated in the drawings is especially designed and particularly useful for the continuous production of high purity carbon disulfide.

As illustrated, the apparatus in general includes a vertically arranged series of superimposed chambers 11, 12, 13 and 14 connected by unobstructed throat passageways of reduced cross section. A fluent gas-pervious mass of solid heat transfer material 10 is caused to flow downwardly by gravity through the chambers and the passageways as a continuous column of material extending from the upper part of the uppermost chamber 11 to the bottom of the lowermost chamber 14. The column of heat transfer material is heated to a predetermined temperature in the upper or heating chamber 11 by direct contact with a high temperature gaseous heating fluid and in its downward movement through the subjacent carbon deposition chamber 12 gives up a portion of its heat energy by direct contact heat exchange with a gaseous hydrocarbon fluid, which is heated to a dissociation temperature in its upward passage through the mass of heat transfer material. The carbon which is released from the gas upon dissociation is deposited upon the surfaces of the heat transfer material 10 while the hydrogen and undissociated components of the gaseous hydrocarbon fluid are discharged as a gas from the upper portion of the chamber 12. The carbon coated heat transfer material passing through the connecting throat to a subjacent reaction chamber 13 is still at a relatively high temperature since the heat transfer involved in the chamber 12 consists mainly in raising the hydrocarbon gas to the desired dissociation temperature and the heat required for the dissociation reaction. While a separate construction and control of the chambers 11 and 12 is preferred, in some cases it may be desirable to combine these chambers into a single chamber with the hydrocarbon being cracked in the lower part thereof and the residual hydrogen-containing gas burned by the admission of combustion air at a higher level.

The relatively high temperature carbon coated heat transfer material received at the upper end of chamber 13 is passed therethrough in direct contact counterflow relationship with a stream of vaporized sulfur. The temperatures maintained in the chamber 13 are sufficient to cause the carbon and the sulfur vapor to react to form carbon disulfide gas. The heat transfer material leaving the reaction chamber 13 will remain at a fairly high temperature and will be substantially free of deposited carbon or entrapped sulfur. The residual heat in the heat transfer material can be recovered by direct contact with air for use as combustion air in the generation of heating fluid for the upper chamber 11. In the preferred embodiment of the invention, the hydrogen resulting from the dissociation in the carbon deposition chamber 12 is advantageously used as fuel in the process. The cooled heat transfer material leaves the lowermost or air preheating chamber 14 through a spout 15 connected at its lower end to a suitable feeder 16. The regulable feeder regulates the rate of flow of the heat transfer material through the apparatus and discharges it into a continuous bucket elevator 17 which returns the heat transfer material to the upper chamber 11 for reuse in the process.

A relatively wide range of materials can be used as the fluent solid heat transfer material 10, the material selected depending upon the particular operating conditions to be maintained within the fluid heating unit. The selection of material is dependent upon both chemical and physical properties. From a chemical standpoint the material should be such as to be stable when subject to exposure to the heating fluid, the gaseous hydrocarbon fluid and its dissociation products, and the reactant fluid. As to physical properties the material should have a high strength and hardness, substantial resistance to thermal shock, and a high softening temperature. Such materials may be natural or manufactured refractories, or corrosion resistant metals, in small pieces of regular or irregular shape. Substantially spherical pellets of manufactured mullite or high alumina refractories have been used. The size of the pellets is such as to provide a large amount of surface area per unit of mass for transfer of heat and at the same time to withstand the fluid flow velocities through the pellet mass while in the heating and cooling chambers without lifting. A preferred size of pellet is approximately $\frac{5}{16}''$ in diameter but the size may vary above and below that value with the individual application of the fluid heater.

As shown in the drawings, the superimposed chambers and connecting throats are enclosed in an elongated metallic casing 20 of generally circular cross-section. The casing is provided with a plurality of inlet and outlet openings for the introduction and discharge of fluids and the heat transfer material as hereinafter described. The interior of the casing is lined with insulating materials 21 and high temperature refractory materials 22 defining the walls of the chambers.

Figure 1:
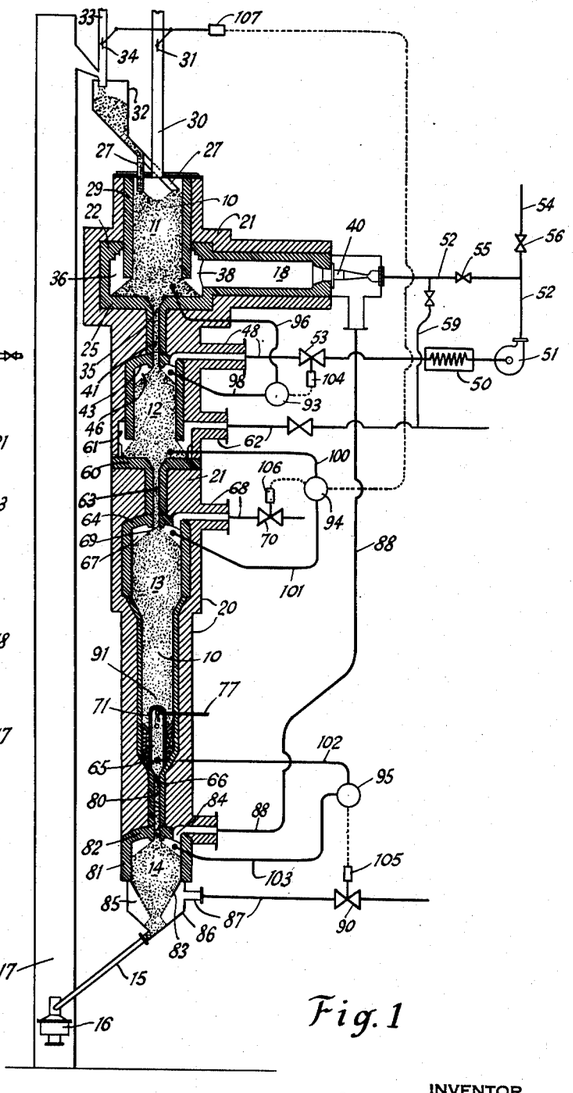
Fig. 1 is a partly diagrammatic sectional elevation of a heating apparatus constructed in accordance with the present invention.
Figures 2, 3, 4:
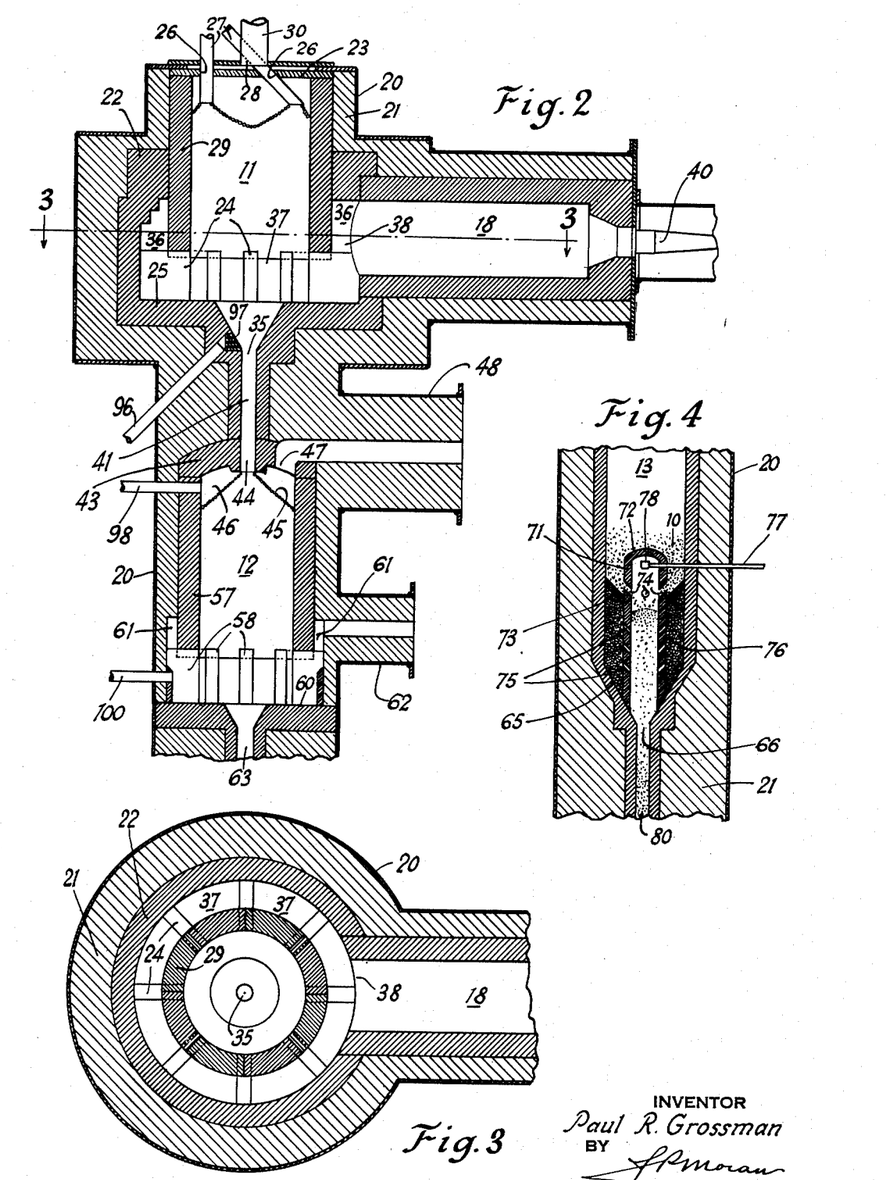
Fig. 2 is an enlarged sectional elevation of a portion of the apparatus shown in Fig. 1.
Fig. 3 is a horizontal section taken on the line 3—3 of Fig. 2.
Fig. 4 is an enlarged sectional elevation of another portion of the apparatus shown in Fig. 1.

The upper heating chamber 11, as shown in Figs. 1, 2 and 3, has a circular wall 29 extending to the flat refractory roof defining the chamber top 23 and supported on a plurality of circumferentially spaced refractory blocks 24 which are in turn supported upon a horizontally disposed refractory floor 25. The top 23 is provided with one or more openings 26 for the pellet spouts 27, as well as with a gas outlet opening 28 connected to an exhaust stack 30 which is provided with a valve or damper 31 to control the flow of spent heating gases passing therethrough from the chamber 11. As shown in Fig. 1, the spouts 27 are connected at their upper end with a closed surge tank 32 which is arranged to receive the pellets 10 discharged by the elevator 17. The tank 32 is provided with a vent stack 33 having a flow control valve or damper 34 so that a limited flow of heating gases upwardly through the spouts 27 from the chamber 11 will tend to entrain any dust particles accumulating at the elevator 17 discharge. The refractory floor 25 of the chamber 11 is provided with a centrally located pellet discharge opening 35. The pellet discharge passageway through the floor 25 to the opening 35 is defined by the annular wall of an inverted truncated cone so proportioned and positioned that an upward extension of the annular wall would intersect the lower circumferential edge of the wall 29.

An annular heating gas distributing chamber 36 surrounds the lower portion of the wall 29 and is provided with an inlet port 38 in one side. The port 38 registers with the discharge end of a horizontally disposed combustion chamber or furnace 18 which is arranged with its horizontal axis intersecting the vertical axis of the chamber 11 above the lower end of the wall 29. Heating gases from the furnace 18 enter the chamber 36 through the port 38 and thereafter pass in a circumferentially distributed stream through passageways 37 between the blocks 24 and beneath the lower edge of the wall 29 through the interstices of the pellet mass to the exhaust stacks.

The furnace 18 is of substantially uniform circular cross-section and is longitudinally elongated to provide adequate space for the complete combustion of the fuel delivered thereto. A burner 40 is provided at the outer end of the furnace and arranged to mix the combustion constituents. As shown in Figs. 1 and 2 the burner is arranged for a gaseous fuel, although it will be understood that a liquid fuel may also be utilized to generate heating gases in the furnace 18. In the preferred embodiment of the invention, as hereinafter described, a hydrogen containing gas is advantageously obtained by the dissociation of a hydrocarbon fluid in the chamber 12 and is utilized as a fuel burned with preheated combustion air from the chamber 14. The flow of the combustion constituents to the furnace is controlled as hereinafter described to obtain the desired heating gas temperature and composition as delivered to the heating chamber 11.

The centrally located opening 35 from the chamber 11 is connected with an elongated throat 41 of reduced cross-sectional area defining an unobstructed passageway for the flow of heated pellets 10 from the heating chamber 11 to the subjacent carbon deposition chamber 12. A refractory wall 57 defines the chamber 12 and extends downwardly to a plurality of circumferentially spaced radially positioned refractory blocks 58 supported upon a refractory floor 60. This construction is similar to that of the upper chamber 11, as is illustrated in Figs. 1 and 2. The lower portion of the chamber wall 57 is encircled by an annular distributing chamber 61 arranged to receive a gaseous hydrocarbon through a valved connecting duct 62. The top 43 of the chamber 12 is formed by a curved refractory arch through which a centrally located opening 44 extends to form a continuation of the throat 41. An annular lip or flange encircles the lower end of the opening 44 to project below the inner face of the top 43 so that the pellets 10 delivered to the chamber 12 will form an upper pellet surface 45 having a contour according to its angle of repose. A discharge port 47 is in communication with the annular space 46 between the upper pellet surface 45 and the lower face of the top 43 and connects with a duct 48 for the discharge of the gaseous products resulting from the dissociation in the chamber 12.

In the normal stabilized operation of the apparatus, the pellets 10 flow through the throat 41 from the heating chamber 11 at a high temperature into and through the chamber 12. Simultaneously the hydrocarbon gas passes in counterflow relationship to the pellets, entering at the bottom of the chamber with the dissociated gases leaving at the top. The hydrocarbon gas is quickly heated to a temperature approaching the pellet temperatures with a resulting dissociation and the liberation of pure carbon. The carbon so released is deposited on the surfaces of the pellets which act as a carrier medium for transporting the carbon, while maintaining its temperature, to the subjacent reaction chamber 13. The gaseous residue of the hydrocarbon gas consists primarily of hydrogen and flows through the port 47 into the duct 48. The gaseous residue leaves the chamber 12 at a temperature substantially corresponding with the temperature of the heated pellets 10 entering the chamber 12 and is passed through the duct 48 to a gas cooler 50 for delivery to a pressure boosting fan 51. The fan delivers the gas under pressure to a duct 52 leading to the burner 40 and to a branch duct 54 which is open to the atmosphere or another point of use. The adjustment of the valves 53, 55 and 56 in the ducts 48, 52 and 54 respectively is made in accordance with the flow and pressure requirements of the related chambers, as hereinafter described.

In leaving the chamber 12 the carbon coated pellets pass through a connecting throat 63, which is similar in construction to the throat 41, into the subjacent reaction chamber 13 where the pellet mass passes downward in counterflow direct contact flow relationship with sulfur vapor. In the arrangement shown the sulfur is introduced in a liquid state to the lower portion of the chamber 13 and is volatilized in its initial contact with the heated pellets. The sulfur vapor is thereafter superheated in its upward flow through the interstices of the pellet mass to a reactive temperature with the carbon on the pellets. Thereafter gaseous carbon disulfide formed by the thermal reaction of carbon and sulfur is withdrawn from the chamber for further processing, storage or immediate use, as desired.

The chamber 13 is vertically elongated and is provided with an upper portion having a cross-sectional area greater than the cross-sectional area of its lower portion. The chamber is defined by a vertical refractory wall with a domed top 64 and an inverted frusto-conical bottom 65 with a central opening 66 therein for the discharge of the pellets. A centrally located opening 69 extends through the top 64 to form a continuation of the throat 63 and is provided with an encircling lip or flange which extends into the chamber 13 to provide an annular space 67 between the upper surface of the pellets and the lower surface of the top 64. An outlet duct 68 is in communication with the space 67 through an outlet port in the wall and casing. A valve 70 is positioned in the duct 68 to regulate the flow of fluid therethrough as hereinafter described.

As shown in Figs. 1 and 4, a hollow refractory cylinder 71 having a domed top 72 and of lesser outside diameter than the inside diameter of the chamber 13 wall is coaxially positioned in the lower portion of the chamber 13. The cylinder 71 is supported upon the interior surface of the inverted frusto-conical bottom 65 of the chamber 13 and is spaced from the chamber walls by a pellet deflecting inverted frusto-conical, perforated flange 73. The wall of the cylinder 71 is provided with a circular series of inclined ports 74 positioned above the flange 73 to permit an inward movement of pellets therethrough. The wall of the cylinder is further provided with a plurality of ports 75 which are located beneath the flange 73 to provide additional openings for the movement of vapor from the interior of the cylinder 71 outward and then upwardly through the interstices of a stationary gas-pervious refractory mass 76 supporting the flange 73, through the perforations of the flange and thence upwardly through the interstices of the column of pellets 10 within the chamber 13.

A pipe 77 is extended through the walls of both the chamber 13 and the internal cylinder 71 to end in a spray nozzle or atomizing head 78 which is arranged to discharge liquid sulfur introduced through the pipe 77 in a downwardly directed spray onto the surfaces of the pellets 10 entering the interior of the cylinder 71 through the ports 74. With the arrangement described the liquid spray contacts the pellets and is substantially uniformly distributed upon the surfaces of the pellets where it is vaporized by heat exchange therewith.

The opening 66 in the lower portion of the chamber 13 is connected with the chamber 14 by a throat 80 which directs a flow of pellets into the upper portion of the chamber 14. The chamber 14 is defined by a refractory wall 81 of circular cross-section having a domed top 82 and a metallic frusto-conical bottom 83. The top 82 of the chamber is provided with an outlet opening 84 for the discharge of heated air. The frusto-conical bottom 83 of the chamber is formed of a metallic plate which is provided with a multiplicity of openings in its lower portion. A surrounding annular space 85 is defined by a metallic casing 86 supported by the casing 20. An air inlet duct 87 connects the annular space 85 with an externally arranged fan (not shown), while an air outlet duct 88 connects the outlet 84 with the burner 40. A valve 90 in the duct 87 regulates the flow of air to the chamber 14 and the furnace 18 and is controlled as hereinafter described.

In the operation of the described apparatus for the continuous production of high purity carbon disulfide, the pellets 10 are heated in the upper chamber 11 by direct contact with the heating gases generated by the combustion of fuel in the furnace 18. In the preferred process, hydrogen-containing gases produced by the dissociation of a hydrocarbon, such as propane ($C_3H_8$), in the carbon deposition chamber 12 are burned in the furnace 18 with combustion air preheated in the chamber 14. The resulting combustion gases are delivered to the heating chamber 11 at a temperature of approximately 2500° F., the temperature of the heating gas being regulated by controlling the percentage of excess combustion air and the quantity of fuel delivered to the furnace 18. Any excess of hydrogen-containing gas for fuel purposes may be separately recovered or discarded, while any deficiency of hydrogen-containing gas for fuel purposes may be made up by the use of a supplementary fuel, such as for example, propane. Ordinarily there will be a slight excess of hydrogen-containing gas for fuel purposes in the described process. It will be understood that fuel oil or any other liquid or gaseous fuel may be used to produce the heating gases utilized in the heating chamber, the preferred fuel being selected upon the economic evaluation of the use of the hydrogen-containing gas as a fuel versus a separate recovery of the gas for other uses.

The heated pellets 10 enter the carbon deposition zone or chamber 12 at a temperature of approximately 2200 F. and in accomplishing the heating and thermal dissociation of the propane, are cooled to a discharge temperature of approximately 1800 F. The propane gas is introduced under pressure through the duct 62 into the lower portion of the chamber 12 at approximately atmospheric temperature and due to its intimate contact with the pellets 10 in passing in direct contact countercurrent relationship therewith is rapidly heated to a dissociation temperature which results in a deposition of carbon on the surface of the pellets. The gas discharged from the upper portion of the chamber is primarily composed of hydrogen although normally some slight percentage of carbon will remain with the gas as an undissociated fraction of propane or as free carbon in the form of minute dust particles. The use of propane is considered advantageous as it has a high carbon to hydrogen ratio and in its commercial form is sufficiently pure so that the carbon resulting from its dissociation is substantially free from impurities which might otherwise contaminate the carbon disulfide upon the chemical combination of the carbon and sulfur. While propane is an advantageous source of carbon, it will be understood that other hydrocarbon gases may be utilized, although the temperatures required for the dissociation of other hydrocarbons may vary from those given in the illustrated example. The apparatus of the present invention is readily adapted to the dissociation of any fluid hydrocarbon compound, since a wide range of dissociation temperatures can be attained in chamber 12 merely by proper regulation of the pellet temperature leaving the heating chamber 11.

The carbon coated pellets will enter the reaction chamber 13 at a temperature of approximately 1800 F. and after the heating of the sulfur and chemical combination of the carbon and sulfur has been consummated, the pellets will discharge into the throat 80 at a temperature of approximately 1000 F. The sulfur introduced into the lower portion of the chamber 13 is in a liquid state and at a temperature of about 250 F. Since the liquid sulfur is atomized and sprayed onto the surface of the pellets in the internal cylinder 71 as hereinbefore described, the resulting heat exchange from the pellets will rapidly vaporize and superheat the sulfur, so that at an intermediate point above the chamber 71, such as at 91, the sulfur vapor will be at a temperature of the order of 850 F., and the pellets will have a temperature of approximately 1200 F.

In ascending through the chamber 13 in intimate counterflow contact with the pellets, the sulfur vapor will be uniformly superheated to a carbon reactive temperature which will be reached approximately as the vapor enters the enlarged upper portion of the chamber. As the sulfur vapor is superheated, it is believed that the percentage in the reactive bivalent form ($S_2$) increases in contrast to sulfur as $S_6$ and $S_8$. At temperatures above approximately 1350 F., substantially all of the sulfur is in the S₂ form, so that the reaction temperature in the chamber 13 is preferably maintained above this value. The chamber at this point is increased in diameter to permit a reduced velocity of upward sulfur vapor flow and a reduced downward pellet movement during the thermally reactive period, so that the reaction of the sulfur vapor with the carbon on the pellets will be substantially complete within the chamber. Due to the substantial purity of the carbon deposited upon the pellets and in reactive contact with the sulfur vapor in the chamber, the resulting carbon disulfide will be of high purity and uncontaminated with the usual impurities present in the carbon disulfide heretofore formed by contacting sulfur with charcoal at thermally reactive temperatures.

In the interest of increased thermal efficiency in the operation of the described apparatus, the pellets leaving the chamber 13 are cooled by direct contact with atmospheric air in the chamber 14. As a result the pellets will be discharged from the chamber at a temperature of approximately 400 F. Such a pellet temperature reduction is not only advantageous from the thermal efficiency standpoint but also permits the use of feeding and elevating equipment constructed of ordinary carbon steel. This will result in a reasonable capital investment for the installation and lower fixed charges in the operation of the described apparatus. The use of preheated combustion air is also thermally advantageous in the generation of the heating gases in the furnace 18. It will be understood that the combustion air preheating chamber 14 may be omitted and the pellets reintroduced to the heating chamber 11 at a temperature slightly less than their discharge temperature from the reaction chamber 13, providing the pellet elevating and handling equipment is constructed of high temperature resisting materials.

In starting the described apparatus after a protracted idle period a slow movement of pellets downwardly through the chambers is initiated by proper regulation of the feeder 16. Ordinarily the rate of pellet movement will be one half, or less, of the normally stabilized operating pellet flow rate. With the fluid inlets and outlets of the chambers 12 and 13 closed, fuel and combustion air are delivered to the furnace 18 and burned to generate heating gases to heat the pellets in their flow through the chamber 11. Propane is supplied, as fuel, to the burner 40 through a valved fuel pipe 59 connected between the ducts 62 and 52. Combustion air is passed through the chamber 14 and thence to the furnace 18 in the amounts required for combustion as manually regulated by the valve 90. As the mass of pellets passing through the chambers increases in temperature, the pellet flow rate is likewise increased by suitable regulation of the feeder 16.

With the pellet temperatures approaching an operating value as determined by any of the well known temperature indicating and/or recording devices, sulfur and propane are delivered to the chambers 13 and 12 respectively at rates approximating normal operating conditions. Simultaneously the control mechanism is started for automatic regulation of chamber pressures to maintain a separation of the fluids in the superimposed chambers as hereinafter described. With a flow of propane to the chamber 12, hydrogen-containing gas will be available as a fuel for use in the furnace 18, and the flow of propane through the pipe 59 is discontinued. The initial flow of both sulfur and propane through the chambers is usually discarded due to their contamination by air leaking from the chamber 14. Purging the chambers 12 and 13 however is quickly accomplished and a flow of hydrogen-containing gas through the duct 48 and carbon disulfide through the duct 68 is soon accomplished.

In the operation of the apparatus described it is desirable to avoid a leakage of oxygen or oxygen-containing gases into the several chambers and to prevent a leakage of fluids between the chambers through the connecting throats. The presence of oxygen with the hydrocarbon at the prevailing temperatures in the carbon deposition chamber 12 will permit the formation of combustion products rather than the desired deposition of carbon on the pellets. A leakage of hydrocarbon from the chamber 12 through the throat 63 into the reaction chamber 13 would act as an undesirable dilutent in the carbon disulfide formed by contact of deposited carbon with sulfur vapor. The sulfur introduced into the lower end of chamber 13 will oxidize if brought into contact with oxygen and produce a separate contaminant in the carbon disulfide. Thus leakage into the reaction chamber 13 must also be avoided to obtain the fullest advantage of the capabilities of the apparatus in delivering a relatively high quality carbon disulfide. To obtain the desired results from the apparatus the fluids delivered to the various chambers are maintained at a superatmospheric pressure to prevent air leakage through the enclosing walls; and, as hereinafter described, the fluid flows in the related chambers take place under controlled pressure conditions so as to establish and maintain substantially balanced pressures between adjacent chambers.

As diagrammatically shown in Fig. 1 the control system for the apparatus includes a differential pressure control responsive to the pressure differential at vertically spaced points at opposite ends of each of the throats for regulating the fluid pressures in the various chambers. A typical arrangement of pressure connections is illustrated in Fig. 2 wherein an alloy metal tube 96 extends through the casing and the intervening wall materials to a position adjacent the conical wall of the opening 35 of the chamber 11. As shown, a portion of the wall defining the pellet passageway leading to the opening 35 is formed of a porous block 97 of refractory material which will permit fluid flow therethrough while preventing movement of the pellets 10 into the open end of the tube 96. A second alloy tube 98 is inserted through the casing and intervening wall into the annular space 46 of the chamber 12. The tubes 96 and 98 are extended to a pressure differential sensitive transmitter 93 which is responsive to and measures the pressure differential between the adjacent ends of the chambers 11 and 12. When the pressure differential is equal to zero, the chambers are in balance and fluid flow through the throat 41 is avoided. In as much as the relatively small fluid flow passages provided by the interstices between the pellets in the elongated throats provide an appreciable resistance which must be overcome before any throat flow of fluid will take place, it is not necessary to have an absolute balance or equalization of fluid pressures at opposite ends of a throat in order to secure the desired limitation of flow. The pressure differential is however maintained below a predetermined maximum.

In a similar manner, a transmitter 94 is connected to opposite ends of the throat 63 by the pressure leads 100 and 101, so that the pressure differential between adjacent ends of the chambers 12 and 13 is measured. Likewise a transmitter 95 measures the pressure differential between opposite ends of the throat 89 by a balance of the fluid pressures as obtained through the pressure leads 102 and 103.

The transmitter 93 transmits a power impulse to a power element 104 in response to the pressure differential existing across the throat 41, with the power element 104 positioning the valve 53 to obtain the required fluid flow through the duct 48 to establish and maintain the desired pressure relationship. In a similar manner the transmitter 95 transmits a power impulse to a power element 105 to regulate the position of the air valve 90. Preferably the differential pressure responsive control mechanism is of the pneumatic type, such as disclosed and claimed in the copending applications of E. G. Bailey and R. M. Hardgrove, Serial No. 502,580, filed September 16, 1943, and of E. G. Bailey and P. S. Dickey, Serial No. 506,630, filed October 18, 1943. However, it will be understood that the power elements of the control mechanism may be electrically operated in response to pneumatic or electric impulses from the transmitters.

The fluid pressure responsive transmitter 94 is connected with a power element 106 arranged to regulate the valve 70 in duct 68, and is also connected with a power element 107 arranged to regulate the dampers 31 and 34 in the stacks 30 and 33 respectively. The dampers 31 and 34 are mechanically linked together to be operated in tandem as regulated by the power element 107. The transmitter 94 and the elements 106 and 107 are pneumatically operated and are arranged for sequential operation so that over one range of static pressure, as measured by the transmitter, the element 106 will regulate the valve 70 and over another range of static pressures the element 107 will regulate the dampers 31 and 34. One manner of accomplishing such sequential operation with a pneumatically actuated control system is to arrange a pneumatic power piston as the element 106, which is operable, for example, in a power pressure range of 5 to 20 p. s. i. control pressure as delivered thereto by regulation of the transmitter, while the element 107 is operable in a power pressure range of 20 to 50 p. s. i. control pressure. Thus with the transmitter 94 adjusted to control air pressure to the elements 106 and 107 in proportion to the pressure differentials, a minor departure in throat pressure differential will impose a control air pressure on the element 106 sufficient to regulate the valve 70. An increase in the pressure differential on the transmitter 94 will eventually reach the limit of adjustment of the valve 70 as regulated by the element 106, which would correspond with the 20 p. s. i. air pressure suggested above, and any further increase in pressure differential will actuate the dampers 31 and 34 through the element 107.

With stabilized operating conditions in the fluid heating apparatus shown in Fig. 1, the fluid pressures as measured by the differential pressure transmitters are in a balanced condition. Assume for purposes of illustration that the pressure in the chamber 13 is increased due to an increase in the sulfur delivery rate. Such an increase in chamber pressure will cause the transmitter 95 to regulate the position of the valve 90 to increase the air pressure in the chamber 14 until pressure conditions are reestablished between the ends of the throat 89. The increase of pressure in the upper portion of the chamber 13, as indicated in the lead 101 will cause the transmitter 94 to open the valve 70 to relieve the back pressure on the chamber 13 due to the valve position in the carbon disulfide discharge duct 68. This adjustment may or may not be sufficient to reestablish a balanced pressure condition across the throat 63. If further adjustment is necessary, it will be accomplished by the sequential operation of the element 107 in partially closing the normally open dampers 31 and 34.

Simultaneously with the operation of the transmitter 94, the action of the transmitter 95 in raising the pressure of chamber 14 will cause an increase in the pressure of combustion air delivered to the furnace 18. This in turn will increase the pressure indicated through the lead 96 to the transmitter 93 which will result in a repositioning of the valve 53 by a partial closing thereof to balance the pressure across the throat 41. With a substantially uniform flow of propane through the duct 62, the pressure indicated in the lead 100 to the transmitter 94 will be increased with the closing of valve 53. If the increase in pressure as indicated in the lead 100, resulting from the chain effect of increased combustion air pressure, is insufficient to balance the differential pressure across the throat 63, the effect of partially closing the dampers 31 and 34 will have an additive pressure effect upon the chambers 11 and 12 until the pressures measured by the transmitter 94 are again in balance. Other changes in the operation of the apparatus resulting from internal or external changes in the fluid pressures in the chambers are readily compensated by the control arrangement to maintain balanced pressure conditions between the chambers by the control mechanism opening or closing the flow control valves as required.

Figure 5:
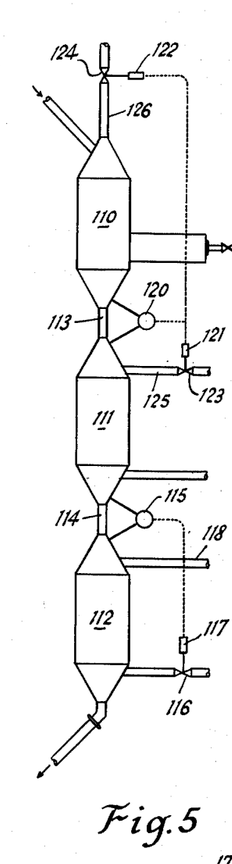
Fig. 5 is a schematic diagram of a modified arrangement of apparatus and controls therefor.

A similar control for a three chamber fluid heater is illustrated diagrammatically in Fig. 5, wherein the superimposed chambers 110, 111, and 112 are connected by the throats 113 and 114. Such a control would be used for example, if the lower chamber 14 of the apparatus described in connection with Fig. 1 were omitted or if some other combination of the chambers were utilized. A transmitter 115 measures the pressure differential across the throat 114 and maintains a balanced fluid pressure condition between the adjacent ends of the chambers 111 and 112 by adjusting the position of a valve 116 through a power element 117 connected thereto. With the arrangement shown, the control of balance pressures across the throat 114 is similar to the control arrangement shown for the throat 89 in Fig. 1. If desirable the transmitter 115 could be used to regulate a valve in the upper discharge duct 118, and in that case the control arrangement would be similar to the control arrangement for the throat 41 of Fig. 1.

A transmitter 120 measures the pressure differential across the throat 113 and maintains a balance fluid pressure condition between the adjacent ends of the chambers 110 and 111. The transmitter 120 is arranged to sequentially operate the power elements 121 and 122 to regulate the valves 123 and 124 respectively. With this arrangement the transmitter 120 is operated as is the transmitter 94 shown in Fig. 1. The valve 123 regulates the flow of fluid leaving the chamber 111 through the fluid discharge duct 125 to the limit of effective valve adjustment, and upon a further need to increase the pressure in the chamber 110, the transmitter 120 actuates the valve 124 in the stack 126 through the element 122.

While in accordance with the provisions of the statutes I have illustrated and described herein the best form of the invention now known to me, those skilled in the art will understand that changes may be made in the form of the apparatus and method of manufacture disclosed without departing from the spirit of the invention covered by my claims, and that certain features of my invention may sometimes be used to advantage without a corresponding use of other features.

I claim:

1. The method of thermally forming carbon compounds which includes heating a fluent mass of gas-pervious heat transfer material to a high temperature, dissociating a hydrocarbon fluid by contact with said heat transfer material with the carbon depositing on the surfaces of said heat transfer material, contacting the deposited carbon on said heat transfer material with a sulfur containing fluid under thermally reactive conditions to form a gaseous sulfur-carbon-compound, and cooling the decarbonized heat transfer material by heat exchange with a separate oxygen containing fluid.

2. The method of forming carbon compounds which comprises continuously heating a fluent mass of heat transfer pellets to a high temperature in a heating zone by direct contact with a heating gas, depositing a coating of carbon on the pellet surfaces of said heated mass in a carbon coating zone by the thermal decomposition of hydrocarbon vapor passing in direct contact with said pellets, withdrawing the gaseous hydrogen-containing residue of the decomposed hydrocarbon from said carbon coating zone, passing the carbon coated pellets with a high residual heat through a reaction zone in contact with a sulfur containing gaseous fluid to form a sulfur carbon compound, and burning said gaseous hydrogen-containing residue to form said heating gas.

3. The method of forming carbon disulfide which includes heating a fluent gas-pervious mass of heat transfer material to a high temperature, depositing a coating of carbon upon the surfaces of said heat transfer material by the direct contact thermal decomposition of a hydrocarbon fluid in a carbon coating zone, utilizing the hydrogen-containing gas resulting from said decomposition in said carbon coating zone as a fuel in generating heating gases to heat said heat transfer material, and contacting the carbon coated heat transfer material with sulfur in a separate zone to cause a thermal sulfur-carbon reaction forming carbon disulfide.

4. The method of forming carbon disulfide which includes heating a fluent gas-pervious mass of solid heat transfer material to a high temperature in a heating zone, depositing a coating of carbon upon the surfaces of said heat transfer material by the thermal decomposition of a hydrocarbon fluid in direct contact therewith in a carbon coating zone, withdrawing the hydrogen containing gas resulting from the decomposition of the hydrocarbon from said carbon coating zone, contacting the carbon coated heat transfer material with sulfur vapor within a reaction zone to form carbon disulfide, and cooling the mass of heat transfer material by contact with a separate fluid within a cooling zone.

5. The method of forming carbon disulfide which comprises heating a fluent mass of heat transfer pellets to a high temperature in a heating zone by direct contact counterflow relationship with a heating gas, depositing a coating of carbon on the pellet surfaces of said heated mass in a carbon coating zone by the thermal decomposition of hydrocarbon vapors passing in direct contact counterflow relationship with said pellets, passing the fluent residue of the decomposed hydrocarbon to a combustion zone for the production of said heating gas, passing said carbon coated pellets into a reaction zone at a high temperature for direct contact with sulfur vapor to form carbon disulfide, and cooling the pellets by heat exchange direct contact with combustion air prior to passing said air to said combustion zone.

6. The method of forming carbon disulfide which comprises continuously heating a moving mass of heat transfer pellets to a high temperature in a heating zone, depositing a coating of carbon on the pellet surfaces of said moving mass of heated pellets in a carbon coating zone by the thermal decomposition of hydrocarbon vapors passing in direct contact counterflow relationship with said pellets, passing the gaseous hydrogen-containing fluid resulting from the decomposition of said hydrocarbon as a combustion constituent to a combustion zone, and passing said carbon coated pellets at a high temperature through a reaction zone in direct contact counterflow relationship with initially liquid sulfur which is vaporized by said pellets and heated to a reaction temperature with the carbon on said pellets to form high purity carbon disulfide.

7. The method of forming carbon disulfide which comprises heating a fluent mass of heat transfer pellets to a high temperature in a heating zone by direct contact counterflow relationship with a heating gas, depositing a coating of carbon on the pellet surfaces of said heated mass in a carbon coating zone by the thermal decomposition of hydrocarbon vapors passing in direct contact counterflow relationship with said pellets, passing at least some of the gaseous residue of the decomposed hydrocarbon from said carbon coating zone to a combustion zone, passing said carbon coated pellets at a high temperature through a reaction zone in direct contact counterflow relationship with initially liquid sulfur which is vaporized by the heat of said pellets and heated to a reaction temperature with the carbon on said pellets to form high purity carbon disulfide, and passing said pellets through a cooling zone in direct contact counter current flow relationship with combustion air subsequently combined with said gaseous residue in said combustion zone for the generation of said heating gas.

8. The method of operating a fluid heater of the type having an upper, intermediate and lower chamber connected in series by throats with heat transfer material in each of the chambers and in the throats and having provision for substantially continually moving said material through said chambers and throats and exteriorly from the lower chamber back to the upper chamber, including, maintaining a supply of heating fluid to the upper chamber to heat the material as it passes therethrough, passing separate fluids to be heated through said intermediate and lower chambers in direct contact with the heated material passing therethrough, regulating the rate of fluid flow to said lower chamber in response to the fluid pressure differential across the throat connecting said intermediate and lower chambers, and maintaining substantially balanced fluid pressures between said upper and intermediate chambers by regulating the pressure of fluid leaving said intermediate chamber and leaving said heating chamber sequentially in response to the magnitude of pressure differential across the connecting throat between said upper and intermediate chambers, whereby fluid flow is continuously maintained through each of said chambers.

9. A fluid heater comprising walls defining superimposed chambers connected in series by elongated throats of reduced cross-sectional area and enclosing a vertically extending column of fluent heat transfer pellets, means for transferring pellets from the bottom to the top of said column to effect a substantially continuous movement of pellets downwardly through said chambers, means for heating the column of pellets within the upper of said superimposed chambers by direct contact heat exchange relationship with a heating gas, means for coating said pellets with carbon within a subjacent pellet coating chamber by the thermal dissociation of a gaseous hydrocarbon in direct contact countercurrent flow relationship with said hot pellets, and means for forming carbon disulfide by the thermal reaction of sulfur vapor with the carbon on said coated pellets including a reaction chamber beneath said pellet coating chamber arranged to receive hot carbon coated pellets at its upper end and high pressure liquid sulfur at its lower end, a hollow cylinder having a closed top and positioned in the lower portion of and radially spaced from the inner walls of said lower chamber, an inverted frusto-conical perforated flange arranged to direct a flow of pellets through ports in the wall of said cylinder, and an atomizing head receiving said liquid sulfur and arranged to direct a downward spray of sulfur on the pellets within said cylinder, the heat of said pellets vaporizing the sulfur within said cylinder and preheating the sulfur vapor in its upward passage through the interstices of the pellet column within the chamber to a reaction temperature with the carbon on the pellets.

10. A fluid heater comprising walls defining superimposed chambers connected in series by elongated throats of reduced cross-sectional area and enclosing a mass of fluent heat transfer pellets, means for causing a substantially continuous movement of said pellets through said chambers, a furnace, means for heating the mass of pellets within one of said chambers by direct contact heat exchange with heating gases generated within said furnace, means for carbon coating said heated pellets within a separate adjacent chamber by the decomposition of a hydrocarbon fluid in contact with said pellets, a separate reaction chamber arranged to receive the heated carbon-coated pellets, a pipe ending in a nozzle for introducing liquid sulfur into the opposite end of said reaction chamber for vaporization and countercurrent flow through the heated carbon-coated pellets, the heat transfer contact between the sulfur vapor and hot carbon-coated pellets causing a thermal reaction between the carbon and sulfur continuously forming carbon disulfide, a pellet cooling chamber beneath said reaction chamber having a valved inlet and an outlet duct for the flow of combustion air therethrough, and a conduit connecting said outlet duct with the furnace for the delivery of preheated combustion air to said furnace.

11. A fluid heater comprising walls defining chambers connected in series by elongated throats of reduced cross-sectional area and enclosing a mass of fluent heat transfer pellets, means for causing a substantially continuous movement of said pellets through said chambers, a furnace, means for heating the mass of pellets within the uppermost of said chambers by direct contact heat exchange with heating gases generated within said furnace, means for carbon coating said heated pellets within a separate adjacent chamber by the decomposition of a hydrocarbon fluid in contact with said pellets, a separate reaction chamber arranged to receive the heated carbon-coated pellets, a pipe ending in a nozzle for introducing liquid sulfur into the opposite end of said reaction chamber for vaporization and countercurrent flow through the heated carbon-coated pellets, the heat transfer contact between the sulfur vapor and hot carbon-coated pellets causing a thermal reaction therebetween continuously forming carbon disulfide, and control means for maintaining the fluid pressures at opposite ends of each of said throats substantially equal to avoid mingling the fluids in said chambers including a differential pressure controller sensitive to differential static pressures at opposite ends of the throat connecting said uppermost chamber and adjacent carbon coating chamber arranged to regulate the fluid pressures in the upper portion of said carbon coating chamber, and a separate differential pressure controller sensitive to differential static pressures at opposite ends of the throat connecting said carbon coating chamber and reaction chamber arranged to regulate the fluid pressure in the upper portion of said reaction chamber and the fluid pressure in said uppermost chamber.

12. A fluid heater comprising a plurality of superimposed chambers connected in series by elongated throat passages and enclosing a vertically extending column of fluent heat transfer material, a feeder arranged to continuously withdraw heat transfer material from the lower end of said column at selected rates, means provided to receive the heat transfer material from said feeder and to return same to the upper end of said column, inlet and outlet ducts in communication with each of said chambers for passing separate fluids through each chamber in heat contact with the column of heat transfer material therein, dampers in said ducts to regulate fluid flows through each chamber, means for continuously heating the heat transfer material within the upper of said superimposed chambers by direct heat exchange contact with a heating fluid, and means for avoiding leakage of fluid between adjacent chambers by maintaining fluid pressures at opposite ends of the connecting throat passages substantially equal including a differential pressure controller associated with each throat passage and sensitive to the differential pressures between the opposite ends of said throat passageway, each of said controllers arranged to position a damper in a duct communicating with one chamber adjacent the throat, and at least one of said differential pressure controllers arranged to position a damper in a separate duct communicating with each of two of said chambers with said dampers being positioned sequentially in accordance with the unbalance of static pressure of fluids at opposite ends of said throat passage, whereby fluid flow is continuously maintained through each of said chambers.

13. A fluid heater of the type having multiple chambers connected in series by unobstructed throats with heat transfer material in each of the chambers and in the throats and having means for substantially continually moving said material through said chambers and throats and exteriorly from the lowermost chamber back to the uppermost chamber, including, inlet and outlet ducts in communication with each of said chambers for passing separate fluids through each chamber in heat contact with the heat transfer material therein, means for maintaining a supply of heating fluid to the uppermost chamber to heat the material as it passes therethrough, means for passing separate fluids to be heated through separate chambers in direct contact with the heated material passing therethrough, a damper in an inlet duct for regulating the rate of fluid flow to one of said chambers, a differential pressure controller arranged to position said inlet duct damper in response to the fluid differential pressures across the throat between said damper regulated chamber and an adjacent chamber, and a separate differential pressure controller sensitive to the differential pressure across a second throat passage for maintaining substantially balanced fluid pressures between the adjacent chambers connected by said second throat said separate controller operatively connected to regulate the position of a damper in each of the outlet ducts from one of said throat connected chambers and from said uppermost chamber in response to the magnitude of the differential throat pressure across said second throat, whereby fluid flow is continuously maintained through each of said chambers.

14. A fluid heater comprising a plurality of superimposed chambers connected in series by elongated throat passages of reduced cross-section and enclosing a vertically extending column of fluent heat transfer material, means for continuously circulating said heat transfer material through said chambers at a selected rate, inlet and outlet ducts in communication with each of said chambers for passing separate fluids through each chamber in direct contact with the heat transfer material therein, dampers in said ducts to regulate fluid flows through each chamber, means for continuously heating the heat transfer material within the upper of said superimposed chambers by direct heat exchange contact with a heating fluid, and a differential pressure controller sensitive to fluid pressure at opposite ends of each of said throat passages, one of said controllers arranged to position one of said dampers to regulate fluid flow to one of the chambers adjacent one of said throat passages, and another of said differential pressure controllers arranged to position a damper in the outlet duct from and to thereby regulate the fluid pressure in a chamber adjacent the throat passage through one range of control pressures and to sequentially position a damper in the outlet duct from and to thereby regulate the pressure of heating fluid in said heating chamber through another range of control pressures in response to the magnitude of said throat differential pressure, whereby fluid flow is continuously maintained through each of said chambers.

15. A fluid heater comprising walls defining superimposed chambers connected in series by elongated throats of reduced cross-sectional area and enclosing a vertically extending column of fluent heat transfer pellets, means for transferring pellets from the bottom to the top of said column to effect a substantially continuous movement of pellets downwardly through said chambers, a furnace, means for heating the column of pellets within the upper of said superimposed chambers by direct contact heat exchange relationship with a heating gas generated in said furnace, means for coating said pellets with carbon within a subjacent carbon coating chamber by the thermal decomposition of a gaseous hydrocarbon in direct contact countercurrent flow relationship with said heated pellets, a pipe arranged to direct a flow of the gaseous residue of said decomposed hydrocarbon to said furnace, a reaction chamber beneath said pellet coating chamber arranged to receive hot carbon coated pellets at its upper end and high pressure liquid at its lower end, a hollow cylinder having a closed top and positioned in the lower portion of and radially spaced from the inner walls of said lower chamber, an inverted frusto-conical perforated flange arranged to direct a flow of pellets through ports in the wall of said cylinder, and an atomizing head receiving said liquid and arranged to direct a downward spray of liquid on the pellets within said cylinder, the heat of said pellets vaporizing the liquid within said cylinder and preheating the vapor in its upward passage through the interstices of the pellet column within the chamber to a reaction temperature with the carbon on the pellets.

16. A fluid heater comprising walls defining superimposed chambers connected in series by elongated throats of reduced cross-sectional area and enclosing a mass of fluent heat transfer pellets, means for causing a substantially continuous movement of said pellets downwardly through said chambers, a furnace, a duct connecting the lower portion of the uppermost chamber with said furnace, a valved outlet duct opening into the upper portion of said uppermost chamber, a pellet coating chamber adjacent said uppermost chamber and having a valved inlet duct opening to the lower portion of the chamber for the admission of a hydrocarbon fluid to and a valved outlet duct for the discharge of gaseous residue from said chamber, a reaction chamber arranged to receive heated carbon-coated pellets and having a valved carbon disulfide outlet duct at its upper end, a spray nozzle in the lower portion of said reaction chamber for the admission of liquid sulphur into vaporizing contact with the hot pellets within said chamber, a lowermost pellet cooling chamber having a valved inlet duct opening into the lower portion of the chamber and an upper outlet duct connecting the chamber with said furnace for the delivery of preheated combustion air to the furnace, and a differential pressure controller associated with each of the throats connecting said chambers, each controller sensitive to the static pressure difference between opposite ends of a throat and operative to position the valve in a fluid flow duct connected with a chamber to maintain substantially balanced pressures between said chambers, one of said controllers operatively connected to sequentially position the valve in the outlet duct from said reactor chamber and from said uppermost chamber.

17. The method of operating a fluid heater of the type having multiple chambers connected in series by unobstructed throats with heat transfer material in each of the chambers and in the throats and having provision for substantially continually moving said material through said chambers and throats and exteriorly from the lowermost chamber back to the uppermost chamber, including, maintaining a supply of heating fluid to the uppermost chamber to heat the material as it passes therethrough, passing separate fluids to be heated through separate chambers in direct contact with the heated material passing therethrough, and controlling the fluid pressure within each of said chambers in response to the unbalance of differential pressure across the throat connecting each of said chambers with an upwardly adjacent chamber, and changing the fluid pressure within the uppermost chamber sequentially and in a direction opposite in value to the change of fluid pressure in another chamber in response to an increase in the magnitude of the pressure differential across the throat superjacent said other chamber beyond a predetermined value, whereby fluid flow is continuously maintained through each of said chambers.

PAUL R. GROSSMAN.

REFERENCES CITED

The following references are of record in the file of this patent:

UNITED STATES PATENTS

| Number | Name | Date |
|---|---|---|
| 2,248,509 | Parsons | July 8, 1941 |
| 2,374,151 | Wolk | Apr. 17, 1945 |
| 2,387,378 | Wolk | Oct. 23, 1945 |
| 2,389,636 | Ramseyer | Nov. 27, 1945 |
| 2,410,309 | Simpson et al. | Oct. 29, 1946 |
| 2,412,135 | Evans | Dec. 3, 1946 |
| 2,418,673 | Sinclair | Apr. 8, 1947 |
| 2,432,520 | Ferro, Jr. | Dec. 16, 1947 |
| 2,432,872 | Ferro, Jr. | Dec. 16, 1947 |
| 2,432,962 | Bergstrom | Dec. 16, 1947 |